United States Patent
Kang et al.

(10) Patent No.: US 9,428,390 B2
(45) Date of Patent: Aug. 30, 2016

(54) POROUS CARBON AND METHOD OF PREPARING THE SAME

(71) Applicants: Hanwha Chemical Corporation, Seoul (KR); SNU R&DB Foundation, Seoul (KR)

(72) Inventors: Shin Hoo Kang, Seoul (KR); Ji Soon Ihm, Seoul (KR); Dong Ok Kim, Seoul (KR); Moon-Su Seo, Seoul (KR)

(73) Assignees: Hanwha Chemical Corporation (KR); SNU R&DB Foundation (KR)

( * ) Notice: Subject to any disclaimer, the term of this patent is extended or adjusted under 35 U.S.C. 154(b) by 38 days.

(21) Appl. No.: 14/417,311

(22) PCT Filed: Jul. 24, 2013

(86) PCT No.: PCT/KR2013/006640
§ 371 (c)(1),
(2) Date: Jan. 26, 2015

(87) PCT Pub. No.: WO2014/017836
PCT Pub. Date: Jan. 30, 2014

(65) Prior Publication Data
US 2015/0191355 A1    Jul. 9, 2015

(30) Foreign Application Priority Data

Jul. 27, 2012 (KR) .................. 10-2012-0082717

(51) Int. Cl.
| | |
|---|---|
| C01B 31/02 | (2006.01) |
| C01B 31/08 | (2006.01) |
| B01J 35/10 | (2006.01) |
| B82Y 10/00 | (2011.01) |
| C01B 31/00 | (2006.01) |
| B01J 21/18 | (2006.01) |
| B01J 27/24 | (2006.01) |

(52) U.S. Cl.
CPC ............... *C01B 31/02* (2013.01); *B01J 21/18* (2013.01); *B01J 35/10* (2013.01); *B01J 35/1061* (2013.01); *B82Y 10/00* (2013.01); *C01B 31/00* (2013.01); *C01B 31/08* (2013.01); *B01J 27/24* (2013.01); *B01J 35/1014* (2013.01); *B01J 35/1019* (2013.01); *B01J 35/1023* (2013.01); *B01J 35/1028* (2013.01); *C01P 2006/12* (2013.01); *C01P 2006/16* (2013.01)

(58) Field of Classification Search
CPC .............................. C01B 31/02; C01B 31/08
See application file for complete search history.

(56) References Cited

U.S. PATENT DOCUMENTS

| | | |
|---|---|---|
| 3,066,099 A | 11/1962 | Mohun |
| 5,561,830 A | 10/1996 | Weinl et al. |
| 5,800,868 A | 9/1998 | Lenander et al. |
| 2002/0097549 A1 | 7/2002 | Maletin et al. |
| 2003/0180209 A1 | 9/2003 | Gordeev et al. |
| 2006/0251565 A1 | 11/2006 | Leis et al. |
| 2009/0036302 A1 | 2/2009 | Gogotsi et al. |
| 2009/0213529 A1 | 8/2009 | Gogotsi et al. |
| 2009/0301902 A1 | 12/2009 | Gogotsi et al. |

FOREIGN PATENT DOCUMENTS

| | | |
|---|---|---|
| AU | 2004260618 B2 | 7/2009 |
| CN | 1112863 A | 12/1995 |
| EP | 0678594 A1 | 10/1995 |
| EP | 1714942 A1 | 10/2006 |
| JP | 2001510435 A | 7/2001 |
| JP | 2004513529 A | 4/2004 |
| JP | 2008536786 A | 9/2008 |
| KR | 100348543 | 11/2002 |
| KR | 20100078706 A | 7/2010 |
| KR | 20100089902 A | 8/2010 |
| WO | 2009079657 A2 | 6/2009 |

OTHER PUBLICATIONS

Ersoy, 'Carbon Coatings Produced by High Temeprature Chlorination of Silicon Carbide Ceramics' in Mat Res Innovat vol. 5 pp. 55-62 (2001).*
Kin-Mei Li et al., "Porous nanocrystalline Ti(CxN1-x) thick films by plasma electrolytic carbonitriding", Electrochemistry Communications, vol. 8, pp. 267-272.
Search Report from European Application No. 13822140.3, dated Feb. 8, 2016.
International Search Report for Application No. PCT/KR2013/006640 dated Oct. 18, 2013.
Schlienger, S. et al., "Micro-, Mesoporous Boron Nitride-Based Materials Templated from Zeolites", Chem. Mater. Dec. 9, 2011, vol. 24, pp. 88-96.
Gogotsi et al., "Carbon coatings on silicon carbide by reaction with chlorine-containing gases", 1997 J. Mater. Chem.7:1841-1848.
Boehm et al. Proc.12th Biennial Conf. on Carbon 149-150 (Pergamon, Oxford, 1975). Abstract only of reference.
Presser et al., "Carbide-Derived Carbons—From Porous Networks to Nanotubes and Graphene", Adv. Funct Mater. vol. 21, 2011, pp. 810-833 (Feb. 9, 2011).

* cited by examiner

*Primary Examiner* — Stuart Hendrickson

(74) *Attorney, Agent, or Firm* — Lerner, David, Littenberg, Krumholz & Mentlik, LLP

(57) ABSTRACT

This disclosure relates to porous carbon and a method of preparing the same. The porous carbon of the present invention is derived from a carbonitride compound having a composition comprising metal and nitrogen. The porous carbon of the present invention comprises both micropores and mesopores, and has a large specific surface area, and thus, may be usefully used in various fields.

12 Claims, 4 Drawing Sheets

POROUS CARBON AND METHOD OF PREPARING THE SAME

CROSS-REFERENCE TO RELATED APPLICATION

This application is a national phase entry under 35 U.S.C. §371 of International Application No. PCT/KR2013/006640, filed Jul. 24, 2013, which claims priority to Korean Patent Application No. 10-2012-0082717, filed Jul. 27, 2012, the disclosures of which are incorporated herein by reference.

TECHNICAL FIELD

The present invention relates to porous carbon and a method for preparing the same. More particularly, the present invention relates to highly porous carbon having a large specific surface area, and a method for preparing the same. This application claims the priority of Korean Patent Application No. 10-2012-0082717 filed with the Korean Intellectual Property Office on Jul. 27, 2012, the entire contents of which are hereby incorporated by reference.

BACKGROUND OF ART

Carbon material is very useful material that is applied in many different industries such as a catalyst, a fuel cell, electrode material for a secondary cell, a super capacitor, composite materials, a gas sensor, a solar cell, various electronic devices and the like. Carbon is being applied in a great variety of forms.

Particularly, carbon fiber, carbon nanotube and the like have very excellent mechanical properties while having high conductivity, and for active carbon or amorphous carbon with very high specific surface area, due to the high porosity and stable property, a lot of studies are being progressed in the field of electrode material for a fuel cell and a secondary cell. And, it draws attention as gas storage material for fuel such as hydrocarbon and hydrogen and the like, or a separation body that can purify contaminated area or harmful gas such as carbon dioxide and the like Recently, carbide derived carbon (CDC) is studied as porous carbon material, and is receiving lots of attention (Gogotsi et al. 1997 *J. Mater. Chem.* 7:1841-1848; Boehm et al. *Proc. 12 th Biennial Conf. on Carbon* 149-150 (Pergamon. Oxford, 1975). Most amorphous CDC has micropores of 2 nm or less, and thus, it was reported to selectively produce 0.6~0.9 nm pores that are ideal for hydrogen storage.

However, mesopores of 2 nm or more are also in great demand in various industries such as semiconductor or large gas storage, adsorption body of medical therapeutics or lubricant adsorbent and the like.

Recently, control of pore volume as well as control of specific surface area and pore size draws attention as more important property. Thus, in order to control pores, CDC synthesis was attempted using various raw materials. As the raw materials of CDC, most carbides such as TiC, ZrC, WC, SiC, TaC, $B_4C$, HfC, $Al_4C_3$ and the like were used, but noticeable result according to the kind of metal atoms of carbide was not obtained, and CDC that can form mesopores of 2 nm or more has not been reported yet.

DETAILED DESCRIPTION OF THE INVENTION

Technical Problem

In order to solve the problems of the prior art, it is an object of the invention to provide porous carbon with high specific surface area including micropores and mesopores.

It is another object of the invention to provide a method for preparing the porous carbon.

Technical Solution

The present invention provides porous carbon derived from a carbonitride compound having a composition represented by the following Formula 1:

$M(C_xN_y)$         [Formula 1]

(in the Formula 1, M is at least one metal selected from the group consisting of Ti, V, Cr, Zr, Nb, Mo, W, Hf, and Ta; x is 0.2 to 0.99, and y is 0.01 to 0.8).

And, the present invention provides porous carbon derived from a carbonitride compound having a composition represented by the following Formula 2:

$M(C_xN_yA_z)$         [Formula 2]

(in the Formula 2, M is at least one metal selected from the group consisting of Ti, V, Cr, Zr, Nb, Mo, W, Hf, and Ta; A is boron (B), hydrogen (H) or oxygen (O); x is 0.2 to 0.99, y is 0.01 to 0.8, and z is 0.01 to 0.2).

And, the present invention provides a method for preparing porous carbon comprising the steps of:

mixing at least one metal source selected the group consisting of metals selected from Ti, V, Cr, Zr, Nb, Mo, W, Hf, and Ta, and oxides thereof with a carbon source:

heating the mixture under nitrogen atmosphere to form a carbonitride compound;

reacting the carbonitride compound with halogen gas; and heating the reaction mixture under hydrogen atmosphere.

ADVANTAGEOUS EFFECTS

Figure 1:
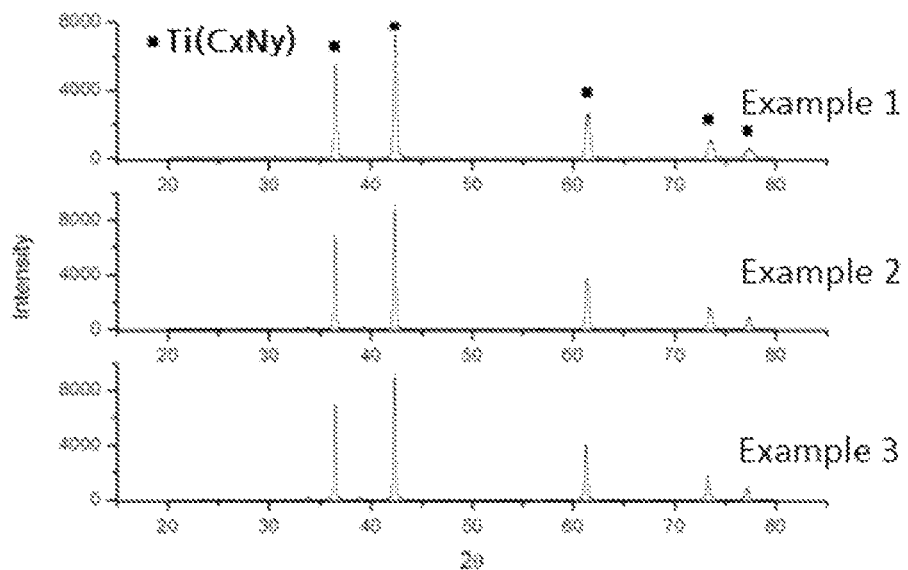
FIG. 1 is a graph showing the XRD results of the carbonitride compounds prepared according to Examples 1 to 3.

The porous carbon of the present invention may be usefully used in various application fields requiring relatively large pores as well as in the fields requiring small pores, by including mesopores with a size of 2 nm or more together with micropores with a size less than 2 nm.

And, according to the preparation method of porous carbon of the present invention, by controlling the compositional ratio of each component of a carbonitride compound, porous carbon having pores of various sizes and specific surface areas may be easily prepared by a simple method.

DETAILED DESCRIPTION OF THE EMBODIMENTS

The porous carbon according to one embodiment of the invention is derived from a carbonitride compound having a composition represented by the following Formula 1.

$$M(C_xN_y) \qquad \text{[Formula 1]}$$

(in the Formula 1, M is at least one metal selected from the group consisting of Ti, V, Cr, Zr, Nb, Mo, W, Hf, and Ta; x is 0.2 to 0.99, and y is 0.01 to 0.8).

The porous carbon according to another embodiment of the invention is derived from a carbonitride compound having a composition represented by the following Formula 2.

$$M(C_xN_yA_z) \qquad \text{[Formula 2]}$$

(in the Formula 2, M is at least one metal selected from the group consisting of Ti, V, Cr, Zr, Nb, Mo, W, Hf, and Ta; A is boron (B), hydrogen (H) or oxygen (O); x is 0.2 to 0.99, y is 0.01 to 0.8, and z is 0.01 to 0.2).

And, the method for preparing porous carbon of the present invention comprises the steps of: mixing at least one metal source selected the group consisting of metals selected from Ti, V, Cr, Zr, Nb, Mo, W, Hf, and Ta, and oxides thereof with a carbon source; heating the mixture under nitrogen atmosphere to form a carbonitride compound; reacting the carbonitride compound with halogen gas; and heating the reaction mixture under hydrogen atmosphere.

Hereinafter, the porous carbon and a method for preparing the same will be explained in detail with reference to drawings.

Porous Carbon

According to one aspect of the invention, provided is porous carbon derived from a carbonitride compound having a composition represented by the following Formula 1:

$$M(C_xN_y) \qquad \text{[Formula 1]}$$

(in the Formula 1, M is at least one metal selected from the group consisting of Ti, V, Cr, Zr, Nb, Mo, W, Hf, and Ta; x is 0.2 to 0.99, and y is 0.01 to 0.8).

In the composition of the Formula 1, the metal (M) may be at least one selected from the group consisting of Ti, V, Cr, Zr, Nb, Mo, W, Hf and Ta.

According to one embodiment of the invention, the metal (M) may be Ti.

Since the carbonitride compound having a composition represented by the following Formula 1 allows vacancy according to the size or binding capacity of metal and carbon, or metal and nitrogen in the crystal, $M:(C_xN_y)$ may have a non-stoichiometric composition.

In the Formula 1, x is the mole ratio of carbon, and y is the mole ratio of nitrogen.

According to one embodiment of the invention, x is 0.2 to 0.99, preferably 0.4 to 0.7. And, y is 0.01 to 0.8, preferably 0.3 to 0.6.

According to another embodiment of the invention, the metal (M) may be a composite metal including Ti and other metal (M') atoms, namely, at least one selected from the group consisting of V, Cr, Zr, Nb, Mo, W, Hf, and Ta. Wherein, the carbonitride compound of the Formula 1 may be represented by the following Formula 1a.

$$(Ti_{1-a}M'_a)(C_xN_y) \qquad \text{[Formula 1a]}$$

(in the Formula 1a, M' is at least one metal selected from the group consisting of V, Cr, Zr, Nb, Mo, W, Hf, and; a is 0.01 to 0.3, x is 0.2 to 0.99, and y is 0.01 to 0.8).

In the composition of the Formula 1a, a denotes the mole ratio of M', x denotes the mole ratio of carbon, and y denotes the mole ratio of nitrogen.

According to one embodiment of the invention, a may be 0.01 to 0.3, preferably 0.01 to 0.2. And, x may be 0.2 to 0.99, preferably 0.4 to 0.7. And, y may be 0.01 to 0.8, preferably 0.3 to 0.6.

The carbonitride compound represented by the Formula 1a may be a substitutional solid solution wherein metal (M) includes Ti and at least one selected from the group consisting of Ti, V, Cr, Zr, Nb, Mo, W, Hf, and Ta is substitutionally inserted partially at the Ti site.

According to one embodiment of the invention, the carbonitride compound of the Formula 1 or Formula 1a may be a solid solution compound consisting only of metal (M), carbon (C) and nitrogen (N).

According to another embodiment of the invention, the carbonitride compound may be a substitutional solid solution or an interstitial solid solution wherein in the Formula 1, at least one of hydrogen (H) or boron (B) is substitutionally or interstitially inserted partially at the nitrogen or carbon atom.

In case a nitrogen or carbon atom is partially substituted with at least one of hydrogen (H) or boron (B) in the substitutional or interstitial form, the carbonitride compound may have a composition represented by the following Formula 2. Thus, the porous carbon according to one embodiment of the invention may be porous carbon derived from a carbonitride compound having a composition represented by the following Formula 2.

$$M(C_xN_yA_z) \qquad \text{[Formula 2]}$$

(in the Formula 2, M is at least one metal selected from the group consisting of Ti, V, Cr, Zr, Nb, Mo, W, Hf, and Ta; A is boron (B), hydrogen (I) or oxygen (O): x is 0.2 to 0.99, y is 0.01 to 0.8, and z is 0.01 to 0.2).

In the composition of the Formula 2, x denotes the mole ratio of carbon, y denotes the mole ratio of nitrogen, z denotes the mole ratio of boron, hydrogen or oxygen.

According to one embodiment of the invention, x may be 0.2 to 0.99, preferably 0.4 to 0.7. And, y may be 0.01 to 0.8, preferably 0.3 to 0.6. And, z may be 0.01 to 0.2, preferably 0.01 to 0.1.

The porous carbon of the present invention is carbonitride derived carbon (CDC). The carbonitride derived carbon is a carbon prepared by thermochemically reacting a carbonitride compound with halogen-containing gas to extract atoms other than carbon in the carbonitride compound, and it exhibits satisfactory physical properties as hydrogen storage material and electrode material compared to the existing activated carbon, and thus, it is drawing attention.

For carbonitride derived carbon, although porous carbon having micropores of 2 nm or less is known, it is not easy to form pores of various sizes including mesopores of a size of 2 nm or more.

As used herein, micropores mean pores having a diameter less than about 2 nm, and mesopores mean pores having a diameter of about 2 nm or more, for example, about 2 to 50 nm.

On the surface of the porous carbon of the present invention, a plurality of pores that include both micropores and mesopores are formed.

As explained above, since the porous carbon of the present invention includes both micropores less than 2 nm and mesopores of 2 nm or more, it may be usefully used in various application fields including the field requiring relatively large pores, for example, storage of larger gas than hydrogen, adsorption body of medical therapeutics or lubricant adsorbent, a catalyst, an electrode of a super capacitor, a filter, and the like, as well as storage and adsorption of small gas such as hydrogen.

According to one embodiment of the invention, the volume ratio of the mesopores may be about 50% V or more, for example about 50 to about 99%, preferably about 80% to about 99%, based on the total volume of the pores including micropores and mesopores. The volume of the pores is measured by introducing nitrogen gas from 0 to 1 atm and converting the amount of adsorbed nitrogen into volume, while maintaining a constant temperature, for example, maintaining 77K using liquid nitrogen. Wherein, the volume ratio of the pores may be calculated by dividing the volume of the pores by the total volume, based on the pores full of gas.

According to one embodiment of the invention, in the porous carbon, micropores having a diameter less than 2 nm may be about 0.001 to about 1.5 cm$^3$/g, preferably about 0.01 to about 1.2 cm$^3$/g, and mesopores having a diameter of 2 nm or more may be about 0.1 to about 5.0 cm$^3$/g, preferably about 0.2 to about 4.5 cm$^3$/g.

According to one embodiment of the invention, the porous carbon may have specific surface area of about 90 m$^2$/g or more, for example, about 90 to about 2.000 m$^2$/g, preferably about 200 to about 2,000 m$^2$/g. The specific surface area may be calculated by the following Formula 1, on the assumption that nitrogen is adsorbed into a monomolecular layer under each pressure condition while introducing nitrogen gas from 0 atm to 1 atm, while maintaining a constant temperature, for example, maintaining 77K using liquid nitrogen.

$$SSA = V_{mono}/22400 * \sigma * N = 4.35 \, V_{mono}$$ [Calculation Formula 1]

(SSA=specific surface area[m$^2$/g], $V_{mono}$=measurement volume of nitrogen adsorbed into a monomolecular layer per gram of pore[m$^3$/g], 22400=volume of 1 mol nitrogen[m$^3$/mol], σ=cross sectional area of nitrogen [m$^2$/atom]. N=Avogadro's number[atom/mol])

The porous carbon of the present invention may be obtained by mixing at least one metal source selected from the group consisting of metals selected from Ti, V, Cr, Zr, Nb, Mo, W, Hf, and Ta with a carbon source comprising carbon, heating the mixture to reduce and carbonize thus forming a carbonitride compound, and then, extracting atoms other than carbon, which will be explained in detail below.

Preparation Method of Porous Carbon

According to another aspect of the invention, provided is a method for preparing porous carbon comprising the steps of: mixing at least one metal source selected the group consisting of metals selected from Ti, V, Cr, Zr, Nb, Mo, W, Hf, and Ta, and oxides thereof with a carbon source; heating the mixture under nitrogen atmosphere to form a carbonitride compound; reacting the carbonitride compound with halogen gas; and heating the reaction mixture under hydrogen atmosphere.

According to one example of the invention, the carbonitride compound may have a composition represented by the following Formula 1.

$$M(C_xN_y)$$ [Formula 1]

(in the Formula 1, M is at least one metal selected from the group consisting of Ti, V, Cr, Zr, Nb, Mo, W, Hf, and Ta: x is 0.2 to 0.99, and y is 0.01 to 0.8).

In the composition of the Formula 1, the metal (M) may be at least one selected from the group consisting of Ti, V, Cr, Zr, Nb, Mo, W, Hf and Ta.

According to one embodiment of the invention, the metal (M) may be titanium (Ti).

According to another embodiment of the invention, the metal (M) may be a composite metal including Ti and other metal (M') atoms, namely, at least one selected from the group consisting of V, Cr, Zr, Nb, Mo, W, Hf, and Ta.

Wherein, the carbonitride compound of the Formula 1 may be represented by the following Formula 1a.

$$(Ti_{1-a}M'_a)(C_xN_y)$$ [Formula 1a]

(in the Formula 1a, M' is at least one metal selected from the group consisting of V, Cr, Zr, Nb, Mo, W, Hf, and;
a is 0.01 to 0.3, x is 0.2 to 0.99, and y is 0.01 to 0.8).

In the composition of the Formula 1a, a denotes the mole ratio of M', x denotes the mole ratio of carbon, and y denotes the mole ratio of nitrogen.

In the carbonitride compound of the Formula 1 or Formula 1a, the carbonitride compound may be solid solution powder.

According to one embodiment of the invention, in the step of mixing metal or oxide thereof with a carbon source, at least one selected from the group consisting of a hydrogen (H) source, a boron (B) source and an oxygen source (O) may be further added and mixed. The hydrogen source, boron source or oxygen source may be gas, a liquid or solid state element or a molecule as long as it includes hydrogen, boron or oxygen. And, an oxide, a hydrate, or a metal compound and the like may be used without specific limitations as long as it includes hydrogen, boron or oxygen.

In case a hydrogen source, a boron source or an oxygen source is further added and mixed in the step of mixing metal or oxide thereof with a carbon source, the carbonitride compound may have a composition represented by the following Formula 2. Thus, the porous carbon according to one embodiment of the invention may be porous carbon derived from a carbonitride compound having a composition represented by the following Formula 2.

$$M(C_xN_yA_z)$$ [Formula 2]

(in the Formula 2, M is at least one metal selected from the group consisting of Ti, V, Cr, Zr, Nb, Mo, W, Hf, and Ta;
A is boron (B), hydrogen (H) or oxygen (O);
x is 0.2 to 0.99, y is 0.01 to 0.8, and z is 0.01 to 0.2).

According to one embodiment of the invention, simultaneously with or after the step of mixing at least one metal source selected from the group consisting of metals and oxides thereof with a carbon source, a pulverization process may be conducted. The pulverization process may be conducted, for example, using a high energy ball mill. By using the high energy ball mill, the mixture of a metal source and a carbon source may be more uniformly mixed, and since the mixture is pulverized with higher energy than a common ball mill, the amount of defects may be increased to stably prepare carbonitride solid solution powder at a temperature of about 800 to about 1,600° C. which is lower than the common carbonitride powder preparation temperature of about 1,700 to about 2,200° C.

When pulverization is conducted using the high energy ball mill, for example, means such as an attritor mill, a planetary mill or a horizontal mill and the like may be used, and it is preferable to conduct dry pulverization at a BPR (ball-to-power ratio) of about 10:1 or more, and a milling speed of about 50 rpm or more.

The step of heating the mixture to form a carbonitride compound may be conducted at a temperature of about 800 to about 1,600° C., preferably about 1,300 to about 1,500° C. for about 5 minutes to about 5 hours, preferably about 1 hour to about 2 hours.

The step of reacting the carbonitride compound with halogen gas to form porous carbon may be conducted at a temperature of about 400 to about 1,200° C. preferably about 400 to about 800° C. for about 1 to about 5 hours, preferably about 1 to about 3 hours. Wherein, the halogen gas used may be preferably chlorine gas.

By reacting the carbonitride compound with halogen gas, most metals (M), nitrogen, oxygen, boron and hydrogen other than carbon are extracted in the carbonitride compound, thus forming pores at the sites of these atoms, thereby obtaining porous carbon.

After reacting the carbonitride compound with halogen gas, the step of heating under hydrogen atmosphere is conducted. The step of heating under hydrogen atmosphere may be conducted at a temperature of about 400 to about 1,000° C., preferably about 400 to about 800° C., whereby remaining halogen gas may be removed.

And, according to one embodiment of the invention, after the step of heating under hydrogen atmosphere to remove remaining halogen gas, the step of activating pores may be further conducted.

By conducting the step of activating pores, more pores may be generated on the surface, or the diameter of pores may be increased, thus more increasing surface area per unit mass. However, conventional pore activation processes using carbon dioxide may cause significant mass loss because carbon is decomposed during the activation process.

According to one embodiment of the invention, the step of activating pores may be conducted by heating porous carbon powder until a specific temperature, for example, about 25 to about 1,000° C. is reached, in the atmosphere of at least one gas selected from the group consisting of inert gas such as He or Ar and $N_2$ gas, and heating at the reached temperature for a specific time, for example, about 10 minutes to about 2 hours, while flowing carbon dioxide gas ($CO_2$). By conducting pore activation using inert gas before introducing carbon dioxide, pore activation may be effectively achieved while reducing carbon loss.

Hereinafter, the present invention will be explained in detail with reference to the following examples. However, these examples are only to illustrate the invention, and the scope of the invention is not limited thereto.

EXAMPLE

Example 1

18.5749 g of $TiO_2$ and 6.4251 g of carbon powder were prepared and mixed.

The mixture was dry-pulverized with a Planetary mill at 250 rpm at BPR (Ball-to-Powder Ratio) of 30:1 for 20 hours using a YSZ (Yittrium Stabilized Zirconia) ball.

After the milling was completed, the pulverized mixture was heated under nitrogen atmosphere (10 torr) at 1,500° C. for 2 hours using a graphite vacuum furnace to prepare carbonitride compound powder having a composition of $Ti(C_{0.352}N_{0.670})$ through reduction and carbonization processes.

3.00 g of the prepared carbonitride compound powder was treated with chlorine gas at 800° C. for 3 hours, and then, heated at 600° C. for 2 hours under hydrogen atmosphere, thereby removing remaining chlorine gas to obtain porous carbon powder.

Examples 2 to 3

Porous carbon powder was prepared by the same method as Example 1, except changing the amounts of $TiO_2$ and carbon powder.

The amounts of raw materials used and the resulting compositions of the carbonitride compounds are shown in the following Table 1.

And, the specific surface area (SSA), the volume of micropores and the volume of mesopores of the porous carbon according to each Example were measured, and the results are also shown in the following Table 1.

Comparative Example 1

3.00 g of commercially available TiC powder (Aldrich, 1-3 μm) was treated with chlorine gas at 800° C. for 3 hours, and then, heated under hydrogen atmosphere at 600° C. for 2 hours, thereby removing remaining chlorine gas to prepare porous carbon powder.

TABLE 1

| Example No. | Composition of carbonitride compound | Raw materials $TiO_2$ (unit: g) | C (unit: g) | SSA (unit: m²/g) | Volume of micropores (unit: cm³/g) | Volume of mesopores (unit: cm³/g) |
| --- | --- | --- | --- | --- | --- | --- |
| 1 | $Ti(C_{0.357}N_{0.670})$ | 18.5749 | 6.4251 | 183.1 | 0.0124 | 0.6854 |
| 2 | $Ti(C_{0.421}N_{0.452})$ | 18.1689 | 6.8311 | 522.1 | 0.1164 | 3.3365 |
| 3 | $Ti(C_{0.576}N_{0.364})$ | 17.7802 | 7.2198 | 1213.2 | 0.1317 | 1.8323 |
| Comparative Example 1 | $TiC_{0.944}$ | TiC 3.00 g | | 1512.0 | 0.6446 | 0.0619 |

The Table 1 shows that total specific surface area (SSA) is in proportion to the volume of micropores.

And, the volume of micropores generally tends to decrease as the volume of mesopores increases in the carbonitride compound.

The maximum value of mesopores was obtained in Example 2 having C:N of 0.421:0.452. Namely, it can be seen that in case the mole fraction of nitrogen is almost similar to that of carbon, maximum pore volume is exhibited, and that specific surface area shows the same tendency as the development of micropores and has little relationship to mesopores.

FIG. 1 is a graph showing the XRD results of the carbonitride compounds prepared according to Examples 1 to 3.

FIG. 1 shows that a Ti(CxNy) phase exists.

Figure 2:
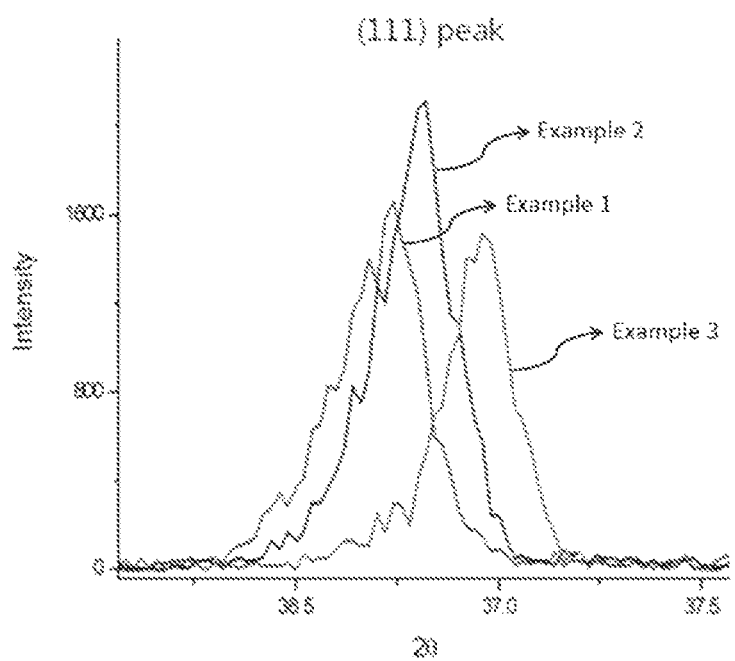
FIG. 2 is a graph showing (111) peak shifts in the XRDs of the carbonitride compounds prepared according to Examples 1 to 3.

FIG. 2 is a graph showing (111) peak shifts in the XRDs of the the carbonitride compounds prepared according to Examples 1 to 3.

Referring to FIG. 2, it can be seen that although lattice constant of crystal changes in proportion to the fraction of carbon and nitrogen in the porous carbon, even if nitrogen content in the carbonitride composition increases from about 0.3 to about 0.7, only the interval in the crystal changes without change in the crystal structure.

Examples 4 to 7

To prepare porous carbon from a carbonitride compound that is a solid solution in which boron (B) is substitutionally inserted, 18.4194 g of $TiO_2$, 0.3211 g of $B_2O_3$ and 6.2595 g of carbon powder were prepared and mixed.

Thereafter, remaining processes were conducted by the same method as Example 1, to prepare porous carbon powder of Example 4.

For Examples 5 to 7, carbonitride compounds were prepared while changing the contents of raw material, and then, porous carbon powders were prepared by the same method as Example 1.

The amounts of raw materials used and the resulting compositions of the carbonitride compounds are shown in the following Table 2.

And, the specific surface area (SSA), the volume of micropores and the volume of mesopores of the porous carbons according to each Example were measured, and the results are also shown in the following Table 2.

Referring to the Table 2, in case porous carbon is obtained from the Ti(CxNy) carbonitride compounds of Examples 4 to 7 wherein boron exists in the substitutional form, the volume of mesopores remarkably increases compared to the porous carbon obtained from the TiC of Comparative Example 1.

Comparing Examples 4 to 7, the volume of mesopores was inverse proportion to the amount of nitrogen in the carbonitride compound, and Example 7 having a composition of $Ti(C_{0.768}B_{0.04}N_{0.192})$ showed the maximum value of mesopores. And, in Example 6 and 7, the volume of mesopores significantly increased compared to Comparative Example 1, and the volume of micropores was as high as Comparative Example 1.

Figure 3:
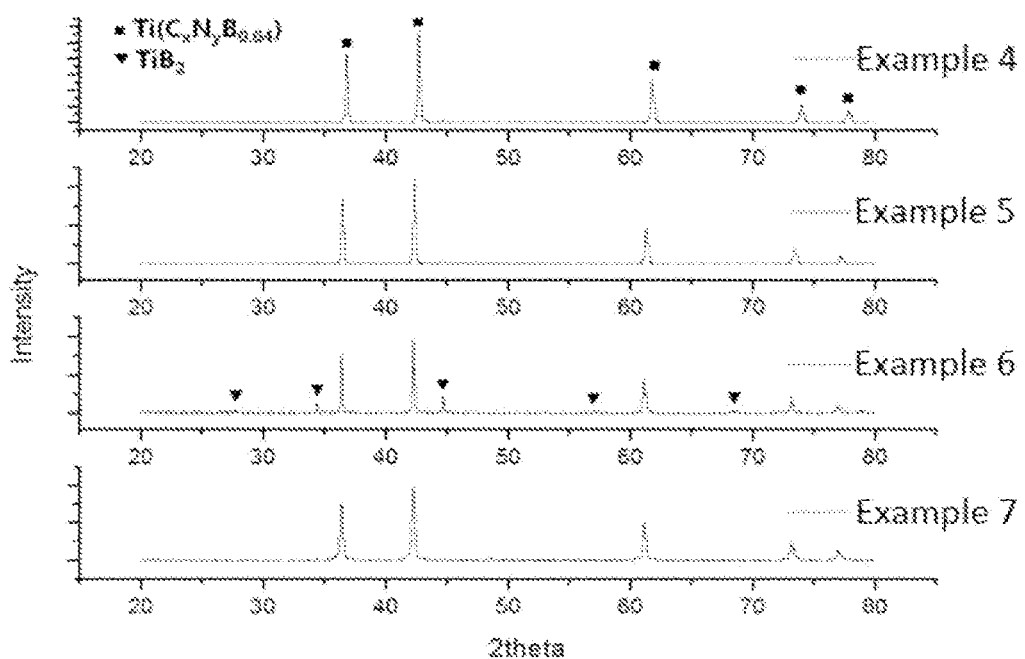
FIG. 3 is a graph showing the XRD results of the carbonitride compounds prepared according to Examples 4 to 7.

FIG. 3 is a graph showing the XRD results of the carbonitride compounds prepared according to Examples 4 to 7.

Figure 4:
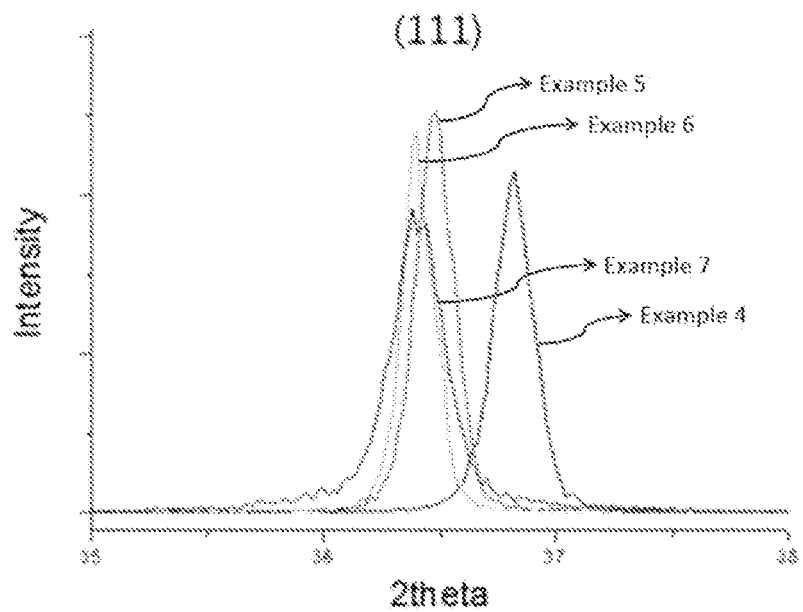
FIG. 4 is a graph showing (111) peak shifts according to change in lattice constant in the XRDs of the carbonitride compounds prepared according to Examples 4 to 7.

FIG. 4 is a graph showing (111) peak shifts according to the change in lattice constant in the XRDs of the carbonitride compounds prepared according to Examples 4 to 7.

Referring to FIGS. 3 and 4, it can be seen that in Examples 4 to 7, even if the ratio of carbon and nitrogen is changed in the carbonitride compounds, only the interval in the crystal changes without change in the crystal structure. Thus, it can be seen that the carbonitride compound is a solid solution in which boron is substitutionally inserted.

Examples 8 to 10

To prepare porous carbon from a solid solution carbonitride compound in which hydrogen (H) is interstitially inserted, 18.1364 g of 0.2904 g of $TiO_2$, $TiH_2$ and 6.5731 g of carbon powder were prepared and mixed.

Thereafter, remaining processes were conducted by the same method as Example 1, to prepare porous carbon powder, and For Examples 9 to 10, carbonitride compounds were prepared while changing the contents of raw material, and then, porous carbon powders were prepared by the same method as Example 1.

The amounts of raw materials used and the resulting compositions of the carbonitride compounds are shown in the following Table 3.

TABLE 2

| Example No. | Composition of carbonitride compound | Raw materials | | | SSA $(m^2/g)$ | Volume of micropores $(cm^3/g)$ | Volume of mesopores $(cm^3/g)$ |
|---|---|---|---|---|---|---|---|
| | | $TiO_2(g)$ | $B_2O_3(g)$ | $C(g)$ | | | |
| 4 | $Ti(C_{0.259}B_{0.04}N_{0.707})$ | 18.4194 | 0.3211 | 6.2595 | 95.68 | 0.0196 | 0.2534 |
| 5 | $Ti(C_{0.465}B_{0.04}N_{0.448})$ | 18.0201 | 0.3141 | 6.6657 | 458.75 | 0.0091 | 0.9033 |
| 6 | $Ti(C_{0.573}B_{0.04}N_{0.384})$ | 17.6377 | 0.3074 | 7.0547 | 1096.7 | 0.6983 | 1.0014 |
| 7 | $Ti(C_{0.688}B_{0.04}N_{0.312})$ | 17.2713 | 0.3011 | 7.4276 | 1342.3 | 0.6200 | 1.9413 |

TABLE 3

| Example No. | Composition of carbonitride compound | Raw materials | | | SSA (unit: m²/g) | Volume of micropores (unit: cm³/g) | Volume of mesopores (unit: cm³/g) |
|---|---|---|---|---|---|---|---|
| | | $TiO_2$ (g) | $TiH_2$(g) | C(g) | | | |
| 8 | $Ti(C_{0.358}H_{<0.05}N_{0.604})$ | 18.1364 | 0.2904 | 6.5731 | 1038.9 | 0.111 | 4.4034 |
| 9 | $Ti(C_{0.581}H_{<0.05}N_{0.486})$ | 17.7394 | 0.2841 | 6.9764 | 1365.1 | 0.006 | 2.5164 |
| 10 | $Ti(C_{0.742}H_{<0.05}N_{0.360})$ | 17.3595 | 0.2780 | 7.3624 | 1464.6 | 1.1767 | 1.5079 |

Referring to the Table 3, in case porous carbon is obtained from the Ti(CxNy) carbonitride compounds of Examples 8 to 10 wherein hydrogen exists in the interstitial form, the volume or mesopores remarkably increased compared to the porous carbon obtained from TiC of Comparative Example 1.

And, unlike Examples 4 to 7 wherein boron exists in the substitutional form. Examples 8 to 10 showed a tendency that the volume of mesopores is proportional to the amount of nitrogen in the carbonitride compound, and Example 8 having a composition of $Ti(C_{0.358}H_{<0.05}N_{0.694})$ showed the maximum mesopores of 4.4034 cm³/g. And, in Example 10, the volume of mesopores significantly increased compared to Comparative Example 1, and the volume of micropores was also higher than Comparative Example 1.

Figure 5:
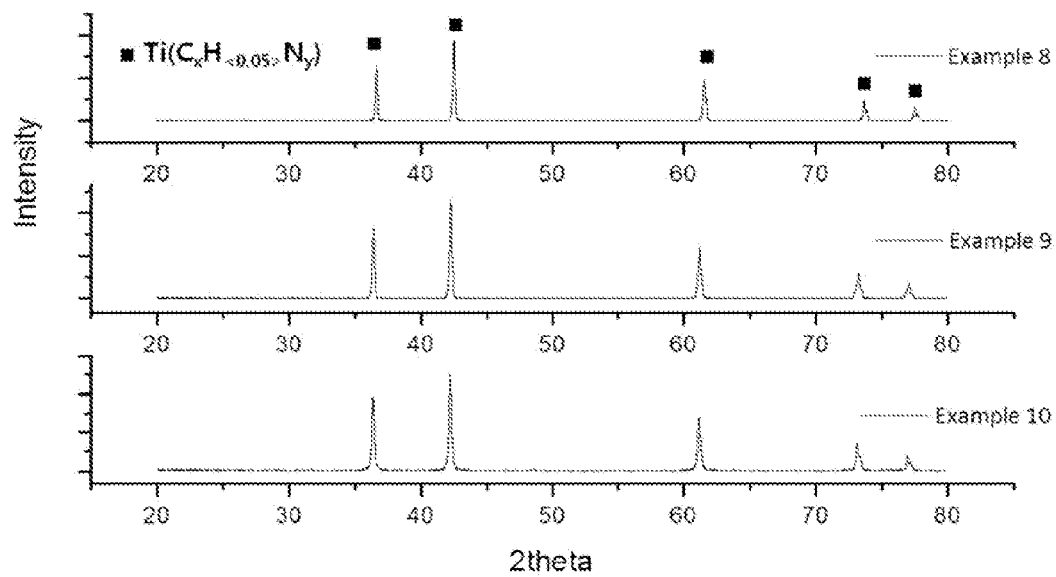
FIG. 5 is a graph showing the XRD results of the carbonitride compounds prepared according to Examples 8 to 10.

FIG. 5 is a graph showing the XRD results of the carbonitride compounds prepared according to Example 8 to 10.

970° C. was reached, a pore activation process was conducted by flowing $CO_2$ at 30 sccm for 30 minutes. The specific surface area (SSA), volume of micropores, and volume of mesopores of the resulting porous carbon are shown in the following Table 4.

Example 13

The porous carbon powder obtained in Example 11 was heated under He atmosphere, and when a temperature of 970° C. was reached, a pore activation process was conducted by flowing $CO_2$ at 30 sccm for 30 minutes. The specific surface area (SSA), volume of micropores, and volume of mesopores of the resulting porous carbon are shown in the following Table 4.

TABLE 4

| Example No. | Composition of carbonitride compound | Raw materials | | | SSA ($m^2$/g) | Volume of micropores ($cm^3$/g) | Volume of mesopores ($cm^3$/g) |
|---|---|---|---|---|---|---|---|
| | | $TiO_2$ (unit: g) | $WO_3$ (unit: g) | C (unit: g) | | | |
| 11 | $(Ti_{0.88}W_{0.12})(C_{0.55}N_{0.45})$ | 13.3137 | 5.2701 | 6.4161 | 1476.9 | 0.6165 | 0.9589 |
| 12 | $(Ti_{0.88}W_{0.12})(C_{0.55}N_{0.45})$ | 13.3137 | 5.2701 | 6.4161 | 1480.1 | 0.0361 | 2.2164 |
| 13 | $(Ti_{0.88}W_{0.12})(C_{0.55}N_{0.45})$ | 13.3137 | 5.2701 | 6.4161 | 1801.7 | 0.4411 | 2.0790 |

Figure 6:
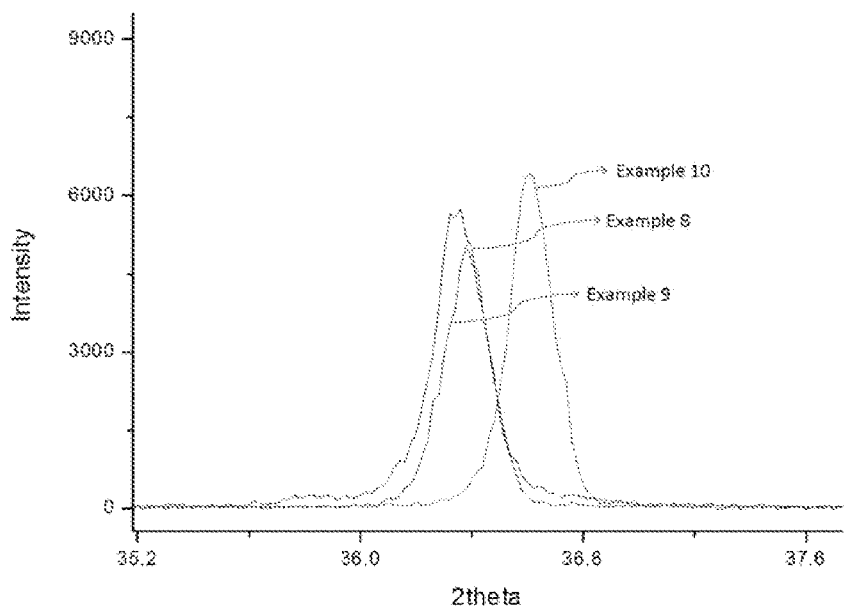
FIG. 6 is a graph showing (111) peak shifts in the XRDs of the carbonitride compounds prepared according to Examples 8 to 10.

FIG. 6 is a graph showing (111) peak shifts in the XRDs of the carbonitride compounds prepared according to Example 8 to 10.

Referring to FIGS. 5 and 6, it can be seen that in the carbonitride compounds of Examples 8 to 10, even if the ratio of carbon and nitrogen changes, only the interval in the crystal changes without change in the crystal structure.

Example 11

To prepare porous carbon from a solid solution carbonitride compound in which tungsten (W) is substitutionally inserted at the titanium (Ti) site, 13.3137 g of $TiO_2$, 5.2701 g of $WO_3$ and 6.4161 g of carbon powder were prepared and mixed.

Thereafter, remaining processes were conducted by the same method as Example 1, to prepare a carbonitride compound, and then, porous carbon powder was prepared by the same method as Example 1.

The amount of raw material used, and the resulting composition of the carbonitride compound, and the specific surface area (SSA), volume of micropores and volume of mesopores of the porous carbon are shown in the following Table 4.

Example 12

The porous carbon powder obtained in Example 11 was heated under $N_2$ atmosphere, and when a temperature of Referring to Table 4, it can be seen that in Example 11, the volume of micropores increases compared to Example 3 wherein tungsten is not substituted.

And, comparison of Examples 11, 12 and 13 shows that mesopores may be remarkably increased by conducting a pore activation process, and that in case He is used as atmosphere gas rather than $N_2$ when conducting the pore activation process, micropores and mesopores may be simultaneously grown. Thus, according to the activation process of the present invention by using inert gas such as He, $N_2$ and the like as temperature raising atmosphere, carbon loss may be reduced, and remarkable $CO_2$ activation effect for increasing mesopores may be exhibited.

Figure 7:
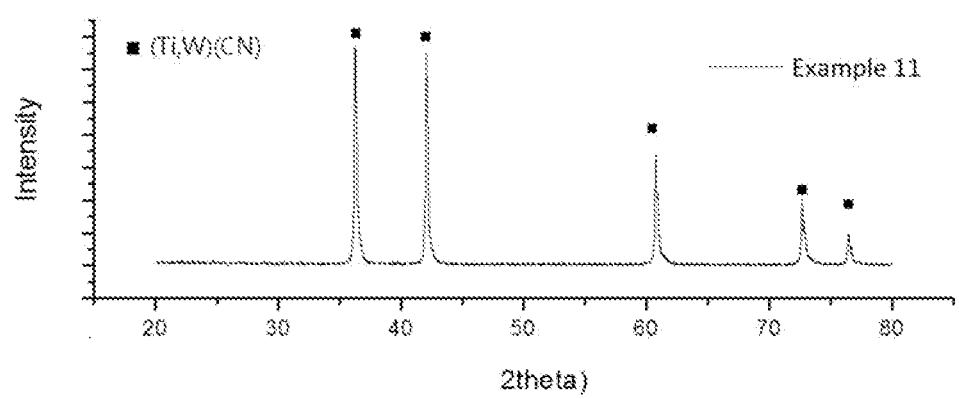
FIG. 7 is a graph showing the XRD results of the carbonitride compound prepared according to Example 11.

FIG. 7 is a graph showing the XRD result of the carbonitride compound prepared according to Example 11.

FIG. 7 shows that a TiW(CxNy) phase exists.

The invention claimed is:

1. A method for preparing porous carbon comprising the steps of:
    mixing at least one metal source selected the group consisting of metals selected from Ti, V, Cr, Zr, Nb, Mo, W, Hf, and Ta, and oxides thereof with a carbon source;
    heating the mixture under nitrogen atmosphere to form a carbonitride compound;
    reacting the carbonitride compound with halogen gas; and
    heating the reaction mixture under hydrogen atmosphere.

2. The method according to claim 1, wherein the carbonitride compound has a composition represented by the following Formula 1:

$$M(C_xN_y) \quad \text{[Formula 1]}$$

in the Formula 1, M is at least one metal selected from the group consisting of Ti, V, Cr, Zr, Nb, Mo, W, Hf, and Ta;

x is 0.2 to 0.99, and y is 0.01 to 0.8.

3. The method according to claim 1, wherein in the step of mixing a metal source with a carbon source, at least one selected from the group consisting of a hydrogen source, a boron source and an oxygen source is further added and mixed.

4. The method according to claim 3, wherein the carbonitride compound has a composition represented by the following Formula 2:

$$M(C_xN_yA_z) \quad \text{[Formula 2]}$$

in the Formula 2, M is at least one metal selected from the group consisting of Ti, V, Cr, Zr, Nb, Mo, W, Hf, and Ta;

A is boron (B), hydrogen (H) or oxygen (O);

x is 0.2 to 0.99, y is 0.01 to 0.8, and z is 0.01 to 0.2.

5. The method according to claim 1, further comprising the step of pulverizing the mixture, simultaneously with or after the step of mixing a metal source with a carbon source.

6. The method according to claim 5, wherein the step of pulverizing the mixture is conducted using a high energy ball mill.

7. The method according to claim 1, wherein the step of heating the mixture to form a carbonitride compound is conducted at a temperature of 800 to 1.600° C. for 5 minutes to 5 hours.

8. The method according to claim 1, wherein the halogen gas is chlorine ($Cl_2$) gas.

9. The method according to claim 1, wherein the step of reacting a carbonitride compound with halogen gas is conducted at a temperature of 400 to 1,200° C. for 1 to 5 hours.

10. The method according to claim 1, wherein the step of heating under hydrogen atmosphere is conducted at a temperature of 400 to 1,000° C.

11. The method according to claim 1, further comprising the step of activating pores, after the step of heating under hydrogen atmosphere.

12. The method according to claim 11, wherein the step of activating pores comprises heating the porous carbon under atmosphere of at least one gas selected from the group consisting of inert gas and $N_2$ gas; and flowing carbon dioxide gas ($CO_2$) at the heated temperature.

* * * * *